United States Patent
Takeuchi et al.

[11] Patent Number: 6,013,349
[45] Date of Patent: Jan. 11, 2000

[54] WIPING SHEET

[75] Inventors: Naohito Takeuchi; Nariaki Shimoe; Daisuke Yamada, all of Kagawa, Japan

[73] Assignee: Uni-Charm Corporation, Ehime, Japan

[21] Appl. No.: 09/045,075

[22] Filed: Mar. 20, 1998

[30] Foreign Application Priority Data

Mar. 21, 1997 [JP] Japan .................................... 9-068728

[51] Int. Cl.⁷ .................................................... B32B 5/14
[52] U.S. Cl. ........................ 428/152; 428/198; 428/212; 428/219; 442/382; 442/401
[58] Field of Search ............................ 15/208; 156/290, 156/308.4; 428/152, 198, 212, 219; 442/382, 401

[56] References Cited

U.S. PATENT DOCUMENTS

| | | | |
|---|---|---|---|
| 3,965,518 | 6/1976 | Muoio | 15/104.93 |
| 4,377,615 | 3/1983 | Suzuki et al. | 428/213 |
| 4,426,417 | 1/1984 | Meitner et al. | 428/195 |
| 4,436,780 | 3/1984 | Hotchkiss et al. | 428/198 |
| 4,784,892 | 11/1988 | Storey et al. | 428/172 |
| 4,906,513 | 3/1990 | Kebbell et al. | 428/198 |
| 5,039,431 | 8/1991 | Johnson et al. | 264/113 |
| 5,229,191 | 7/1993 | Austin | 428/198 |
| 5,368,668 | 11/1994 | Tochacek et al. | 156/93 |
| 5,543,004 | 8/1996 | Tochacek et al. | 156/93 |
| 5,573,719 | 11/1996 | Fitting | 264/129 |

FOREIGN PATENT DOCUMENTS

| | | |
|---|---|---|
| 0097036 | 12/1983 | European Pat. Off. . |
| 0703308 | 3/1996 | European Pat. Off. . |
| 0826811 | 3/1998 | European Pat. Off. . |
| 6-022891 | 2/1994 | Japan . |
| 9-234167 | 9/1997 | Japan . |

*Primary Examiner*—Jenna Davis
*Attorney, Agent, or Firm*—Koda & Androlia

[57] ABSTRACT

An absorbent core 4 composed of a nonwoven fabric containing an absorbent fiber at 20% by weight or more to 80% by weight or less and a hydrophobic fiber at 20% by weight or more to 80% by weight or less is interposed between a top sheet 3 and a bottom sheet 5, both the sheets being composed of a nonwoven fabric containing an absorbent fiber, such as rayon, at 30% by weight or more to 70% by weight or less and a hydrophobic fiber at 30% by weight or more to 70% by weight or less. Then, the top sheet 3, the absorbent core 4 and the bottom sheet 5 are bonded together on bonding lines 2. These individual layers are water retentive because of the absorbent fiber therein, and the resulting sheet has good slip properties because of the hydrophobic fiber contained therein. The absorbent core 4 works to enhance the bending resistance.

15 Claims, 4 Drawing Sheets

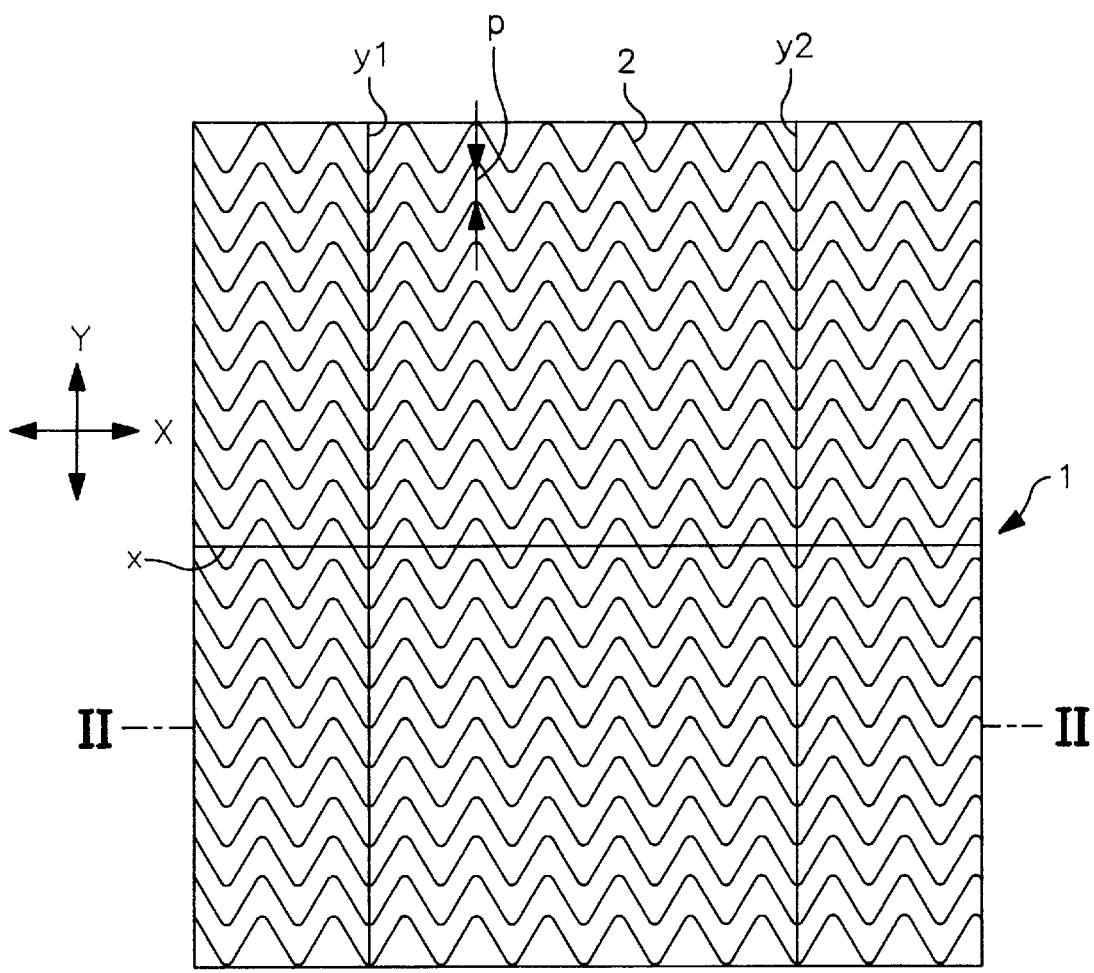
FIG. IA
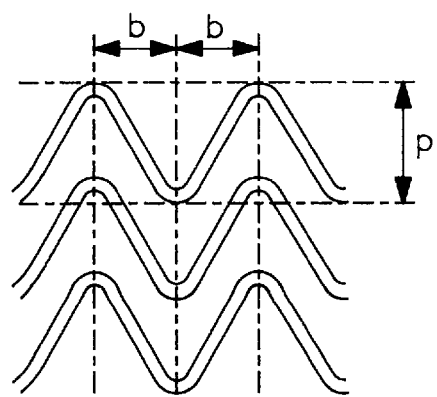
FIG. IB

WIPING SHEET

BACKGROUND OF THE INVENTION

1. Field of the Invention

The present invention relates to a wiping sheet for home use; more specifically, the present invention relates to a disposable wiping sheet for both dry and wet uses and with an excellent surface having good effects on wiping off stain and with an overall high bending resistance.

2. Description of the Prior Art

Disposable wiping sheets for home use may be used being attached to so-called wiping holders or held with hands but not being attached to any holder.

Conventionally, these types of wiping sheets have been prepared by using a nonwoven fabric consisting of interlaced hydrophobic synthetic fibers, or using one or two nonwoven fabrics with a relatively low basis weight, which can be produced by thermally bonding between thermoplastic hydrophobic synthetic fibers. Particularly, so as to absorb water, these wiping sheets may contain an absorbent core of an absorbent fiber (water-retentive fiber) such as rayon or pulp; the absorbent core is interposed between exterior sheets composed of the nonwoven fabrics.

The wiping sheets described above have the following problems.

1. The wiping sheet singly composed of a nonwoven fabric principally comprising a hydrophobic synthetic fiber has a low bending resistance. The wiping sheet with an absorbent core of rayon or pulp also has a low bending resistance in a dry state. When the wiping sheet absorbs water, particularly, the bending resistance is significantly decreased. Therefore, when the wiping sheet is of handheld type, the wiping sheet is difficult to hold with hands and readily falls into shabby appearance during wiping work. When the wiping sheet is used being attached to a wiping holder, the sheet is readily wrinkled or gets shabby because of the low bending resistance.
2. In the case of the wiping sheet with the absorbent core made of rayon or pulp interposed between the exterior sheets, when the wiping sheet is used in a wet state after being squeezed with hands, the wiping sheet can hardly restore its fully extended state because of the low bending resistance. Accordingly, it is laborious to extend the wiping sheet after squeezing. Also it is laborious to attach the squeezed wiping sheet to the wiping holder.
3. In any wiping sheets of conventional examples, the basis weight of the whole wiping sheet is so low that the bulkiness is not sufficient enough. Thus, the wiping sheet gives unpleasant feeling to hands and is readily rolled during the wiping work.
4. When using the wiping sheet with the absorbent core in a wet state, the water retentivity of the whole wiping sheet is low because the exterior sheets therein principally comprise a hydrophobic synthetic fiber and have a low basis weight. Additionally, the pressure loaded from wiping work oozes water contained in the absorbent core out of the exterior sheets, so that the wiping sheet cannot wipe off a large area in a wet state. Furthermore, because the exterior sheets are hydrophobic, an area to be wiped off cannot be immersed with water sufficiently even if the absorbent core contains water. Thus, the wiping effect may be deteriorated.
5. In the case of the wiping sheet which is composed of a nonwoven fabric of a hydrophobic fiber, or the wiping sheet with the absorbent core interposed between the exterior sheets principally comprising a hydrophobic fiber, when the wiping sheet is used in a dry state for cleaning a kitchen area, for example, the wiping sheet cannot sufficiently wipe off spilled water because the surface of such wiping sheet is hydrophobic.

SUMMARY OF THE INVENTION

In accordance with the present invention, the aforementioned problems of the prior art can be overcome. It is an object of the present invention to provide a wiping sheet with a high bending resistance and strength in both the dry state and the wet state for wiping, which also has great water retentivity when moistened in water and is capable of readily wiping off wet stain and is capable of wiping off a large area in a wet state.

So as to solve the problems, a wiping sheet comprises exterior sheets and an absorbent core interposed between said exterior sheets, wherein at least one of the exterior sheets is liquid permeable and the wiping sheet has a bending resistance of 70 mm or more in a dry state and a bending resistance of 60 mm or more in such a state that the wiping sheet contains water, whereby the weight of water is fourfold to the weight of the wiping sheet in the dry state, as measured by the cantilever method according to JIS/L1096 using a test piece of the wiping sheet with a width dimension of 25 mm More preferably, the wiping sheet with a width dimension of 25 mm has a bending resistance of 80 mm or more in a dry state and a bending resistance of 70 mm or more in such a state that the wiping sheet contains water, whereby the weight of water is fourfold to the weight of the wiping sheet in a dry state The wiping sheet has higher bending resistances both in a dry state and in a wet state, and therefore, the wiping sheet hardly gets shabby or hardly generates wrinkles during the wiping work being held with hands or attached to awiping holder. Further, when the wiping sheet is rinsed in water and then squeezed, the wiping sheet can be readily restored to its extended state, so that the wiping sheet can be extended with hands after rinsing; and the wiping sheet can readily be attached to the wiping holder.

Because at least one of the exterior sheets is liquid permeable, preferably water retentive, the sheet surface of the wiping sheet contains water while the wiping sheet is impregnated with water, so that the effect of wiping off stain can be enhanced. Because the wiping sheet has excellent water retentivity as a whole and the exterior sheets are liquid permeable, preferably water retentive, the wiping sheet can clean a large area in awet state, while preventing the contained water form oozing out excessively over the sheet surface.

Preferably, the absorbent core has a basis weight of 25 g/m² or more to 60 g/m² or less, containing a hydrophobic fiber at 20% by weight or more to 80% by weight or less and an absorbent fiber (water retentive fiber) at 20% by weight or more to 80% by weight or less. More preferably, the hydrophobic fiber is a thermoplastic hydrophobic fiber, while the absorbent core is a nonwoven fabric produced by thermally bonding together the thermoplastic hydrophobic fiber.

The absorbent core contains a hydrophobic fiber at 20% by weight or more. Preferably, the absorbent core comprises a thermal bond nonwoven fabric formed by thermally bonding together a thermoplastic hydrophobic synthetic fiber, for example, an air through bond nonwoven fabric produced by welding and melting the fiber together in hot air. If a basis weight of the nonwoven fabric is 25 g/m² or more, the bending resistance, of the absorbent core can be elevated. If the wiping sheet contains an absorbent fiber at 20% by weight or more, the resulting absorbent core can procure a water retentive function when the wiping sheet is moistened with water for wiping work.

Preferably, at least one of the exterior sheets has a basis weight of 25 g/m$^2$ or more to 55 g/m$^2$ or less and contains an absorbent fiber at 30% by weight or more to 70% by weight or less and a hydrophobic fiber at 30% by weight or more to 70% by weight or less.

Because the exterior sheets have water retentivity, the wiping sheet can readily absorb wet stain on the surface when used in a dry state. When the sheet is impregnated with water prior to use, the wiping sheet has a better water retentive function as a whole and the exterior sheets have higher water retentivity, so that the water contained in the absorbent core may not readily be oozed out over the surface of the exterior sheets. Therefore, the wiping sheet can wipe a large area keeping its wet state.

Otherwise, the wiping sheet can be structured as follows; at least one of the exterior sheets has a basis weight of 25 g/m$^2$ or more to 55 g/m$^2$ or less, which is composed of a surface layer and a back layer, wherein the surface layer contains an absorbent fiber at 0% by weight or more to 70% by weight or less and contains a hydrophobic fiber at 30% by weight or more to 100% by weight or less and wherein the surface layer and back layer together contain an absorbent fiber of 35% by weight or more to 70% by weight or less and a hydrophobic fiber at 30% by weight or more to 65% by weight or less.

In this case, the content of the hydrophobic fiber in the surface layer can be higher than the content in the back layer, so that the wiping sheet can readily contain water therein, prevent the water from oozing out over the sheet surface. Furthermore, the slip properties of the sheet surface can be enhanced.

The exterior sheets preferably comprise a nonwoven fabric produced by interlacing together the absorbent fiber and the hydrophobic fiber. If the exterior sheets are composed of a fiber-interlaced nonwoven fabric (spunlace nonwoven fabric), the surface of the wiping sheet can be appropriately fluffed. When the wiping sheet is used in a dry state or such a state that the wiping sheet is impregnated with water, therefore, the fiber on the sheet surface can readily tangle out fine dust and fine stain. If the interval between the interlaced areas in the direction perpendicular to the direction along which spunlace fibers are oriented, namely the length of the non-interlaced area, is 0.5 mm or more to 2.0 mm or less, the surface of the exterior sheets can be appropriately fluffed.

As the absorbent fiber (water retentive fiber), for example, use is made of rayon fiber or cellulose fiber. As the hydrophobic fiber, additionally, use is made of polypropylene (PP), polyethylene (PE), polyethylene terephthalate (PET), nylon and acrylic fiber.

Additionally, a sweat-absorbing synthetic fiber can be contained at least in the surface layer of the exterior sheets. The sweat-absorbing synthetic fiber (hydrophilic fiber) includes sweat-absorbing PP, PE and PET, which are produced by kneading a hydrophilic surfactant into the hydrophobic fiber or coating the hydrophilic surfactant on the hydrophobic fiber. The exterior sheets formed of such sweat-absorbing PP and the like are so hydrophilic that the sheets are water permeable or can retain water. Therefore, the slip properties of the sheet surface can be enhanced much more. Furthermore, the absorbency and water retentivity of the resulting wiping sheet also can be enhanced.

The exterior sheets and the absorbent core are bonded together on a plurality of bonding lines elongating along the direction perpendicular to the direction in which most of fibers are oriented in the exterior sheets. On the bonding lines, the exterior sheets and the absorbent core are bonded together with an adhesive or are thermally bonded together with a thermoplastic hydrophobic fiber.

The pitch of the bonding lines is preferably shorter than the fiber length of the exterior sheets. Because the fiber length of the absorbent fiber to be used in accordance with the present invention is about 30 mm to 60 mm, preferably, the pitch of the bonding lines is 5 mm or more to 30 mm or less. Through such formation of the bonding lines, excessive fluffiness of the fiber can be prevented on the exterior sheets working as wiping surfaces; the surface strength of the wiping sheet can be elevated and the resulting sheet turns durable of repeated wiping works.

Preferably, the basis weight of the exterior sheets is 25 g/m$^2$ or more to 55 g/m$^2$ or less; and the basis weight of the absorbent core is 25 g/m$^2$ or more to 60 g/m$^2$ or less. In this case, the basis weight of the entire wiping sheet is about 75 g/m$^2$ or more to 170 g/m$^2$ or less, so that the wiping sheet has appropriate flexibility and a higher bending resistance.

Additionally, at least one of the exterior sheets preferably is crepe processed preliminary. If the sheets are preliminary crepe processed, the wrinkles on the sheet surface can readily remove stain. Particularly, when the wiping sheet is wet, this can be more effective to remove fixed stain. The process of crepe processing comprises winding a nonwoven fabric composing the exterior sheets over a roll, applying a blade onto the nonwoven fabric, and leading the nonwoven fabric at a lead-in rate slower than the lead-out rate of the roll.

The wiping sheet may be held with hands for use or attached to a commercially available cleaning kit (wiping holder) for use. From the respect of the attachment onto a wiping holder, preferably, the areas on both the sides of the wiping sheet to be held on a wiping holder should be processed so flexible by emboss processing and the like as to give a lower bending resistance to the areas on both the sides than the bending resistance at the central area of the wiping sheet. The areas on both the sides of the wiping sheet are readily attached to the wiping holder because of such process of giving flexibility. Thus, the wiping sheet is prevented from falling out of the wiping holder readily. In other words, the wiping sheet has a higher bending resistance as a whole and is thus readily attached to the wiping holder.

BRIEF DESCRIPTION OF THE DRAWINGS

FIG. 1(A) is a plane view of the wiping sheet of the present invention, as viewed from the side of the top sheet;

FIG. 1(B) is a partial enlarged plane view of FIG. 1(A);

DETAILED DESCRIPTION OF THE PREFERRED EMBODIMENTS

The present invention will now be described in the following examples with reference to drawings.

FIG. 1(A) is a plane view of the wiping sheet of the present invention, as depicted from the side of the exterior sheet. FIG. 1(B) is a partial enlarged plane view of FIG. 1(A). In FIG. 1(A), the Y direction is a machine direction (MD) along which a web is led out during sheet formation; the X direction is a cross direction (CD) perpendicular to the Y direction. The directions of fibers are oriented randomly along the X and Y directions; for example, relatively more fibers are oriented along the Y direction (MD).

In accordance with the present invention, for example, the wiping sheet 1 is inwardly folded along folding lines y1 and y2 in parallel with the Y direction, and then, the sheet is additionally folded into halves along a folding line "x" in parallel with the X direction. A plurality of such wiping sheets are then packaged in a packaging container and the like for goods on the market.

Figure 2:
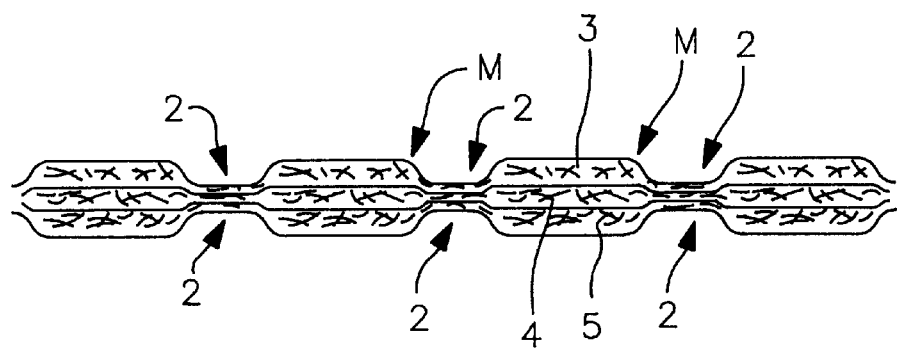
FIG. 2 is a cross sectional view of FIG. 1 along line II—II.

FIG. 2 is a cross sectional view along line II—II of FIG. 1(A). As shown in FIG. 2, the wiping sheet 1 of the present invention is of a trilayer structure of three sheets in lamination, the sheets being top sheet 3, absorbent core 4 and bottom sheet 5 from the top. The top sheet 3 and bottom sheet 5 are exterior sheets. Each of the top sheet 3, absorbent sheet 4 and bottom sheet 5 comprise a nonwoven fabric formed from an absorbent fiber (water retentive fiber) and a hydrophobic fiber (thermoplastic hydrophobic synthetic fiber).

As the absorbent fiber, use is made of for example a rayon fiber or a cellulose fiber, but any fibers with water retentivity and absorbency can be used, with no specific limitation. As the hydrophobic fiber, use is made of polypropylene (PP), polyethylene (PE), polyethylene terephthalate (PET), nylon and acrylic fibers, preferably a thermoplastic hydrophobic synthetic fiber.

The top sheet 3 and bottom sheet 5 contain the absorbent fiber at 30% by weight or more to 70% by weight or less; and the hydrophobic fiber at 30% by weight or more to 70% by weight or less. Each of the top sheet 3 and bottom sheet 5 comprise a nonwoven fabric (spunlace fabric) produced by interlacing together these fibers. The spunlace fabric is produced by forming a fiber web with a card machine and then applying water jet to the fiber web thereby partially interlacing together fibers in the fiber web. Because the fibers tend to fluff in non-interlaced fiber areas, such fluffed fibers can tangle and remove fine dust. Thus, the resulting wiping sheet has a surface suitable for wiping off stain and dust. If too much fibers are fluffed, alternatively, the strength of the resulting wiping sheet is deteriorated, while causing dust to generate therein. So as to make the surfaces of the top sheet and the bottom sheet fluffed appropriately, the interval between the interlaced areas in the direction perpendicular to the direction in which most of fibers are oriented, namely the length of the non-interlaced area, is preferably 0.5 mm or more to 2.0 mm or less. The top sheet 3 and the bottom sheet 5 may be of absolutely the same composition, but the contents of the absorbent fiber and the hydrophobic fiber may vary.

The absorbent core 4 preferably comprises an air through bond nonwoven fabric, produced by thermally bonding together a fiber web. The fiber web contains the absorbent fiber at 20% by weight or more to 80% by weight or less and the hydrophobic fiber at 20% by weight or more to 80% by weight or less. Because the air through bond nonwoven fabric is produced by bonding together its fibers therein, the nonwoven fabric has a greater bending resistance than that of the spunlace fabric. Therefore, the resulting wiping sheet 1 can procure the bending resistance owing to the absorbent core.

The basis weights of the top sheet 3 and the bottom sheet 5 are individually 25 g/m$^2$ or more to 55 g/m$^2$ or less; and the basis weight of the absorbent core 4 is 25 g/m$^2$ or more to 60 g/m$^2$ or less. Therefore, the total basis weight of the wiping sheet 1 is about 75 g/m$^2$ or more to 170 g/m$^2$ or less. Accordingly, the resulting wiping sheet 1 is wholly so bulky and readily held with hands. If the basis weight of the absorbent core 4 is within the range described above, the whole wiping sheet 1 can get a sufficiently high bending resistance and can therefore have a water retentive function. If the basis weights of the top sheet 3 and the bottom sheet 5 both as the exterior sheets individually are within the range described above, the sheet surface of the resulting wiping sheet 1 can absorb wet stain for use in a dry state; for use being impregnated with water, the exterior sheets can retain an appropriate water retentive function and can also serve to prevent water which is absorbed in the absorbent core 4 from oozing over the sheet surface rapidly.

The top sheet 3 and the bottom sheet 5 are overlaid on both the faces of the absorbent core 4, and the resulting trilayer sheet is interposed between a heat emboss roll with wave emboss formed on the surface and a heat roll with a flat surface or between two heat emboss rolls, so that the trilayer sheet are pressurized and heated at the emboss process, whereby the thermoplastic hydrophobic fiber, which is contained in the top sheet 3, absorbent core 4 and bottom sheet 5, is thermally melt so that the trilayer sheet is thermally bonded together to form bonding lines 2. As shown in FIGS. 1(A) and 1(B), the bonding lines 2 are formed in a wave form, elongating along the X direction perpendicular to the Y direction (MD) where the fibers are mainly oriented.

The fiber lengths of the absorbent fiber and the hydrophobic fiber used in the top sheet 3, absorbent core 4 and bottom sheet 5 are about 30 mm to about 60 mm. The term "fiber length" means the substantial fiber length (on average) in the nonwoven fabric. For example, if the nonwoven fabric includes fibers in a crimped state, the fiber length should be determined including the length in a crimped state. The bonding lines 2 have a pitch "p" in the Y direction, which is shorter than the fiber length. The pitch "p" of the bonding liner, 2 is preferably 5 mm or more to 30 mm or less. If the bonding lines 2 are formed at the pitch "p", excessive fluffiness and drop-out of the fiber from the sheet surface can be prevented.

The form of the bonding lines 2 is not Limited to the wave form as shown in FIG. 1, but includes saw tooth forms and linear forms. Nevertheless, bonding lines of wave forms or saw tooth forms can effectively exert the wiping effect in all the directions. As shown in FIG. 2, more specifically, the trilayer sheet is recessed under pressure at the bonding lines 2. Hence, the resulting trilayer sheet protrudes at boundaries between the bonding lines 2 and not-bonded areas, to form protrusions M, and in the areas of the protrusions M, the wiping sheet can exert the effect of removing stain. If the bonding lines 2 are of a wave form or a saw tooth form, the protrusions M can be formed to direct toward any directions in addition to the X and Y directions. Thus, the wiping effect can be exerted by the protrusions M in any of the directions.

Means for bonding together the top sheet 3, absorbent core 4 and bottom sheet 5 is not limited to the hot melt bonding as described above; an adhesive such as hot melt adhesive may be coated on the faces of the absorbent core 4 opposing to the top sheet 3 and the bottom sheet 5, or on the faces of the top sheet 3 and the bottom sheet 5 opposing to the absorbent core 4, while pressing the adhesive coated areas by means of an emboss roll and forming then bonding lines 2 through the adhesion.

Because the wiping sheet of the present invention contains the absorbent fiber in each of the top sheet, the bottom sheet and the absorbent core, the wiping sheet can absorb water during dry wiping. By presetting the contents of the absorbent fiber and the hydrophobic fiber contained in the top sheet 3 and the bottom sheet 5 to the aforementioned values, the water absorbency of the top sheet 3 and the bottom sheet 5 can be enhanced during dry wiping. If impregnated with water or liquid chemicals, the wiping sheet can have such good water retentivity that the wiping sheet also can be used for wet wiping. In this case, because the absorbent fiber can serve to retain water and the hydrophobic fiber can prevent outward water permeation, rapid flow of water over the sheet surface can be prevented, so that the wiping sheet can serve to wipe a large area in a wet state with no exception. Because the top sheet 3 and the bottom sheet 5 working as wiping area contain the hydrophobic fiber, additionally, these sheets can smoothly slip on tables or floors during both dry wiping and wet wiping, so that the wiping work can be readily performed.

When the absorbent core 4 contains the hydrophobic fiber in above mentioned range and its air through bond nonwoven fabric is composed of the thermally bonded thermoplastic hydrophobic fibers, the bending resistance of the absorbent core 4 is enhanced, so that the bending resistance of the trilayer sheet is also enhanced as a whole. Because the bonding lines 2 are formed at an appropriate pitch "p", furthermore, the bending resistance of the trilayer sheet can be enhanced due to the presence of the bonding lines 2. Thus, the wiping sheet can readily be extended due to the own bending resistance, after the wiping sheet is rinsed in water and squeezed.

Figure 3:
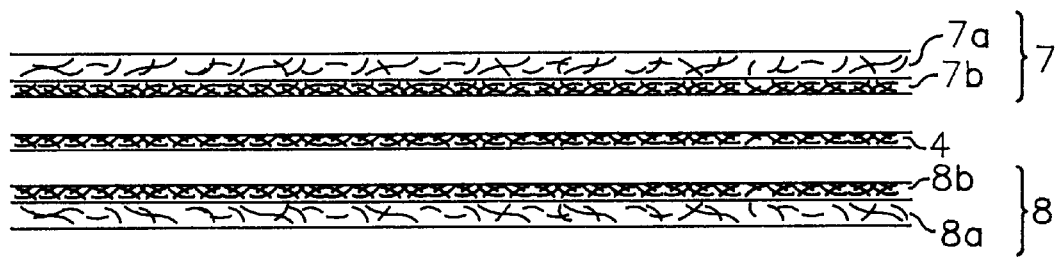
FIG. 3 is a cross sectional view of another embodiment of the wiping sheet of the present invention.

The top sheet 3 and the bottom sheet 5 may be of a lamination structure as shown in FIG. 3. FIG. 3 is a cross sectional view of another embodiment of the wiping sheet shown in FIG. 2, depicting the state of the trilayer sheet prior to bonded together on bonding lines 2.

In the wiping sheet shown in FIG. 3, the exterior sheets, namely the top sheet 7 and the bottom sheet 8, are independently of a bilayer structure of surface layers 7a, 8a and back layers 7b, 8b. Such sheets can be produced by forming fiber webs of the bilayer structure of the surface layer and the back layer, and by subsequently interlacing together fibers into a spunlace nonwoven fabric. Alternatively, the surface layer and the back layer are separately formed, followed by hot melting or adhesive bonding.

Like the top sheet and the bottom sheet as described in FIG. 2, the surface layers 7a, 8a are formed from an absorbent and water-retentive fiber such as rayon fiber and a hydrophobic synthetic fiber such as polypropylene, polyethylene, nylon and acrylic fiber. The contents of the individual fibers in the surface layers 7a, 8a are preferably as follows; the absorbent fiber such as rayon is at a content of 0% by weight or more to 70% by weight or less and the hydrophobic fiber is at a content of 30% by weight or more to 100% by weight or less. The back layers 7b, 8b are primarily formed from an absorbent fiber such as rayon fiber. Preferably, the content of the absorbent fiber in the back layer is higher than that in the surface layer. For example, the contents of the absorbent fiber and the hydrophobic fiber in the back layer are preferably about 70% by weight and about 30% by weight. Because the back layer contains the absorbent fiber at such a high content as described above, the back layers 7b, 8b are highly absorbent. When wet stain is to be wiped off by means of the resulting wiping sheet, the water passing through the surface layers 7a, 8a is absorbed into the back layers 7b, 8b, in a secure manner. Because water is absorbed in the back layers 7b, 8b, as described above, the content of the hydrophobic fiber in the surface layers 7a, 8a can be elevated, whereby the water absorbency and water retentivity of the whole wiping sheet are enhanced. Additionally, the slip properties of the surfaces of the top sheet and the bottom sheet can be elevated further.

Preferably, in the top sheet 7 and the bottom sheet 8, the total content of the absorbent fiber is 35% by weight or more to 70% by weight or less; and the total content of the hydrophobic fibers therein is 30% by weight or more to 65% by weight or less.

The basis weights of the top sheet 7 and the bottom sheet 8 are about 25 g/m$^2$ or more to 55 g/m$^2$ or less, like the top sheet and the bottom sheet as shown in FIG. 2, and the basis weight of the surface layer to the basis weight of the back layer is about 1:1. Thus, the total basis weight of the wiping sheet is about 75 g/m$^2$ or more to 170 g/m$^2$ or less. At such basis weight, the flexibility of the wiping sheet is appropriate and the bending resistance thereof is excellent. Therefore, such wiping sheet can endure repeated use.

The absorbent core 4 is interposed between the top sheet 7 and the bottom sheet 8, which are then bonded together by the same bonding method as described above, to prepare the wiping sheet shown in FIG. 1.

As the hydrophobic fiber to be used in the top sheets 3,7 and the bottom sheets 5,8, particularly the hydrophobic fiber to be used in the surface layers 7a, 8a, use is made of hydrophilic or sweat-absorbing fibers such as sweat-absorbing polypropylene (PP), sweat-absorbing polyethylene (PE) and sweat-absorbing polyethylene terephthalate (PET), whereby the water permeation and water retentivity of each sheet can be enhanced. The sweat-absorbing PP, sweat-absorbing PE and sweat-absorbing PET are produced by coating hydrophilic surfactants on the PP, PE and PET fibers or kneading the surfactants into these fibers, whereby these fibers can procure such a property that water may readily adhere to these fibers. Because nonwoven fabrics containing such sweat-absorbing PP and sweat-absorbing PET have slip properties and water retentivity, the surface slip properties of the top sheet and the bottom sheet can be enhanced and the whole wiping sheet can get higher water retentivity. As such sweat-absorbing PET, for example, a fiber under a trade name of "K07" manufactured by Toyobo Co., Ltd can be used.

In each sheet comprising such a trilayer structure, two types or more of absorbent fibers may satisfactorily be used and two types or more of hydrophobic fibers may satisfactorily be used as well.

Additionally, the top sheet and the bottom sheet may be flat, but these sheets may be crepe processed, satisfactorily. If crepe processed, these sheets can scrub off stain at the protruded parts between wrinkles. The process of crepe processing comprises winding a nonwoven fabric composing the top sheet and the bottom sheet over a roll, attaching a blade to the nonwoven fabric, and winding in the nonwoven fabric at a lead-in rate slower than a lead-out rate of the roll.

Figure 4:
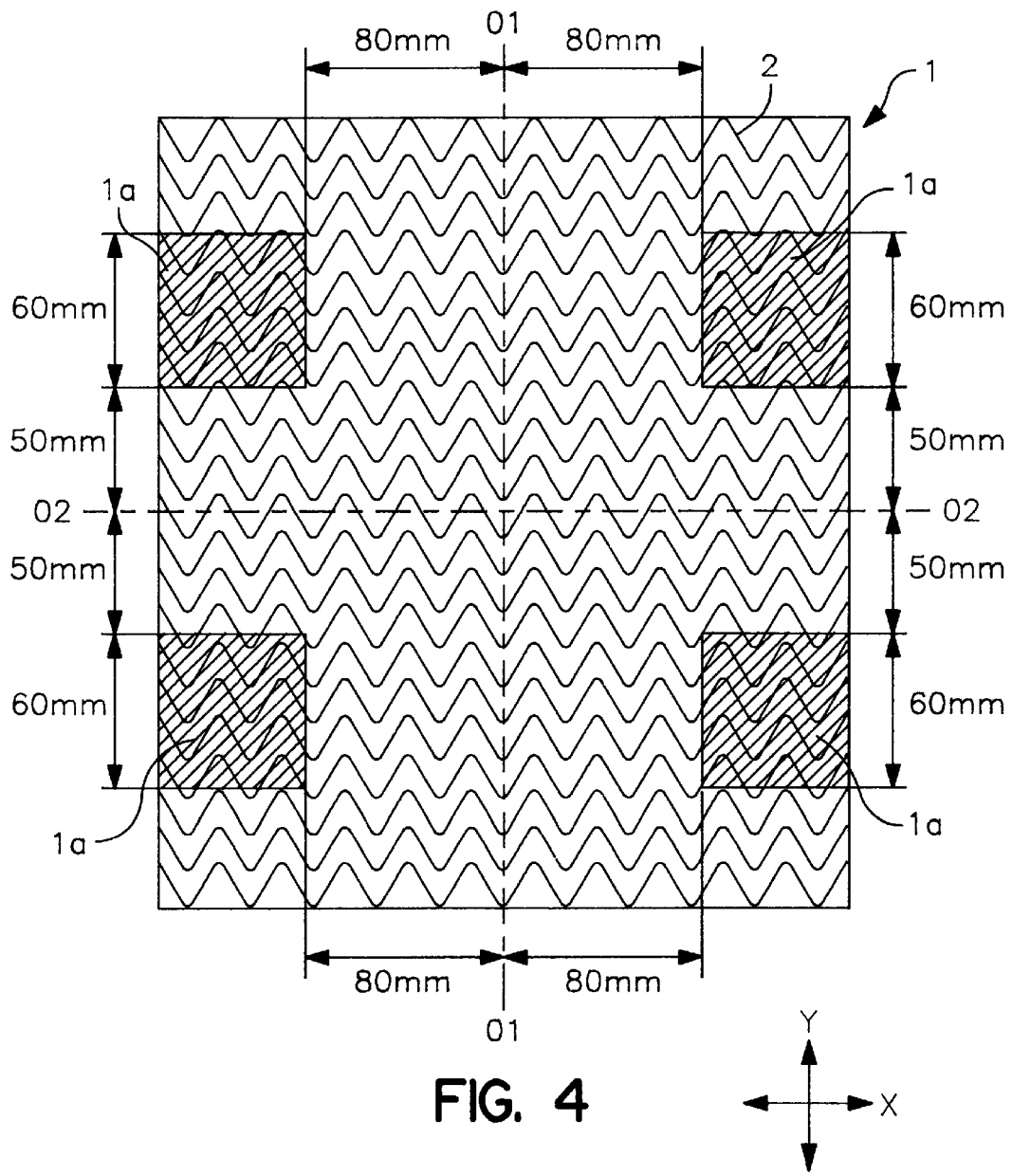
FIG. 4 is a plane view of another embodiment of the wiping sheet of the present invention, as depicted from top.
Figure 5:
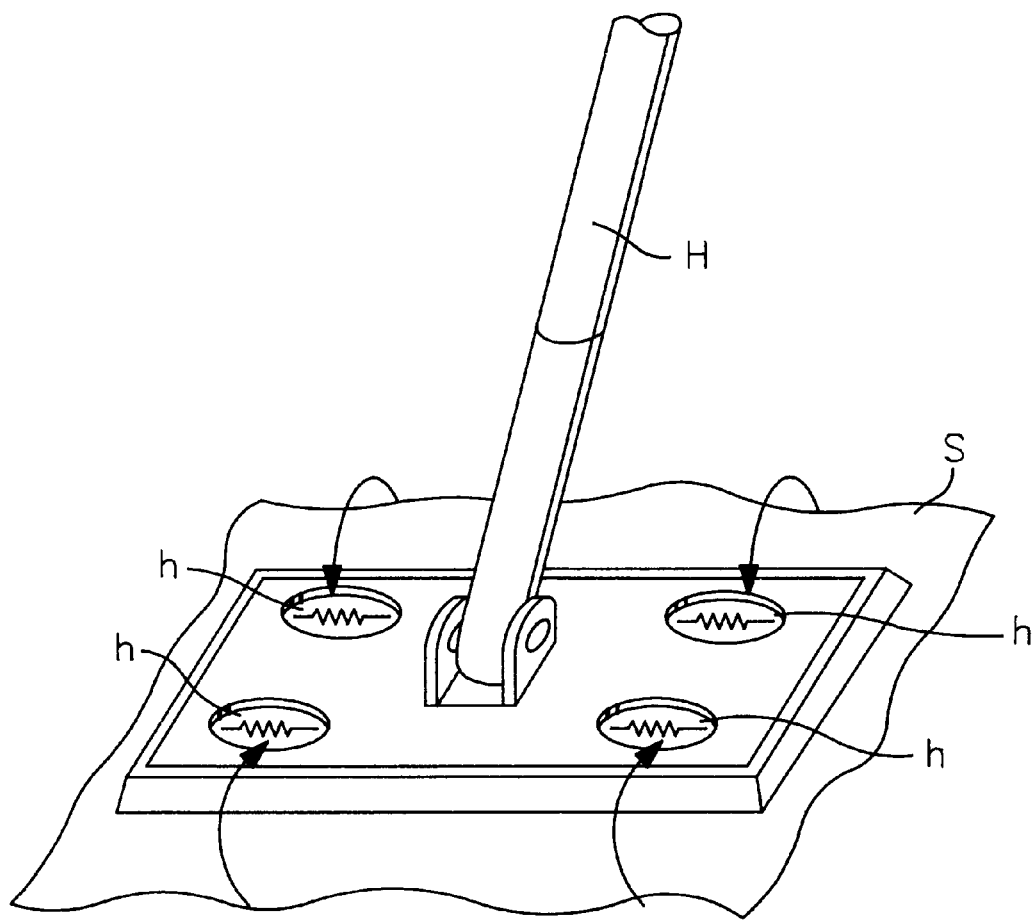
FIG. 5 is an explanatory view for use of the wiping sheet of the present invention.

The wiping sheet 1 is put to use, while being held directly with hands or being attached to a commercially available wiping holder H as shown in FIG. 5. When the wiping sheet is to be used after attached to the wiping holder H, region 1a indicated by hatching in FIG. 4 is preferably emboss processed to be flexible. If the region 1a is processed as flexible, the whole wiping sheet 1 is readily attached at the flexible part to the wiping holder H and is scarcely dropped out therefrom, even if the wiping sheet 1 is so bulky and has a high bending resistance as a whole.

In the wiping sheet 1 shown in FIG. 4, emboss is processed in zones on both the sides in the X direction thereof to form flexible regions 1a. For use on a general commercially available cleaning kit (wiping holder), the emboss processed regions 1a may be formed in zones apart by 80 mm to both sides from the center line 01, which is extending in the Y direction, and apart by 50 mm to both sides from the center line 02, which is extending in the X direction, each of the zones being at the length of 60 mm in the Y direction. In such wiping sheet with emboss processed only in the zones to be attached to the cleaning kit, the flexible regions 1a work as a marker so as to attach the wiping sheet to the cleaning kit, so that the wiping sheet is readily attached to the wiping holder. Altanatively, the flexible regions 1a may be formed on both sides of the wiping sheet 1 in the X direction and on the overall length of the wiping sheet in the Y direction.

The wiping sheet is for home use so as to clean floors and so on, in a dry state or a wet state impregnated with liquid chemicals or water. Because the top sheet and the bottom sheet are slippery, then, the wiping sheet smoothly facilitates cleaning works without excessive force. Because the fibers of the top sheet and the bottom sheet are fluffy in the non-interlaced areas of the nonwoven fabric composed of interlaced fibers, the fluffy fibers can tangle and remove fine dust. Because the absorbent core has the high bending resistance, the whole wiping sheet is tough. When the wiping sheet is impregnated with liquid chemicals or water, the top sheet, the absorbent core and the bottom sheet work together to retain the liquid, so that the wiping sheet can retain the wet state for a long term to wipe off a larger area. Furthermore, the wiping sheet is so strong that the wiping sheet can be rinsed in water, squeezed like scrubbing cloth and recycled for use, after stained once.

The following sheets were prepared as examples of the wiping sheet of the present invention as described above, to examine the performance.

EXAMPLE

Example 1

In Example 1, the following wiping sheets of Examples A, B, C, D and E shown in Table 1 were prepared, like the wiping sheet shown in FIG. 2. For comparison with the Examples, wiping sheets of Comparative Examples A, B, C, D, E and F were prepared.

TABLE 1

| No. | Top sheet · Bottom sheet | | | | Absorbent core | | | | Total |
|---|---|---|---|---|---|---|---|---|---|
| | producing method | rayon fiber % | synthetic fiber % | Basis weight g/m² | producing method | rayon fiber % | synthetic fiber % | Basis weight g/m² | basis weight g/m² |
| Example A | spunlace | 70 | 30 | 40 | air through bond | 50 | 50 | 40 | 120 |
| Example B | spunlace | 50 | 50 | 40 | air through bond | 50 | 50 | 40 | 120 |
| Example C | spunlace | 30 | 70 | 40 | air through bond | 50 | 50 | 40 | 120 |
| Example D | spunlace | 50 | 50 | 25 | air through bond | 50 | 50 | 25 | 75 |
| Example E | spunlace | 50 | 50 | 50 | air through bond | 50 | 50 | 60 | 160 |
| Comparative Example A | spunlace | 80 | 20 | 40 | air through bond | 50 | 50 | 40 | 120 |
| Comparative Example B | spunlace | 10 | 90 | 40 | air through bond | 50 | 50 | 40 | 120 |
| Comparative Example C | spunlace | 50 | 50 | 40 | — | — | — | 0 | 80 |
| Comparative Example D | spunlace | 50 | 50 | 40 | spunbond | — | 100 | 20 | 100 |
| Comparative Example E | spunlace | 50 | 50 | 20 | air through bond | 50 | 50 | 20 | 60 |
| Comparative Example F | spunlace | 50 | 50 | 60 | air through bond | 50 | 50 | 60 | 180 |

The compositions of the raw materials in the top sheets, the absorbent cores and the bottom sheets in the Examples A, B, C, D and E and the Comparative Examples A, B, C, D, E and F were as follows; the absorbent fiber was a rayon fiber of 1.5 denier and a 44-mm fiber length (if the fiber is crimped, the fiber length is determined by the crimped fiber length; the same is true hereinbelow) which is manufactured by Toho Rayon, Co., Ltd.; and the hydrophobic fiber was polyethylene terephthalate (PET) of a melting point as low as 130° C., 2.0 denier and a 51-mm fiber length, or PET of 1.4 denier and a 44-mm fiber length, which were manufactured by Toyobo, Co., Ltd. The PET with the low melting point was used at 20% by weight in the hydrophobic fiber, while the PET of 1.4 denier and 44-mm fiber length was used at the remaining part therein in the top sheet and the bottom sheet. In the absorbent core, furthermore, the PET with the low melting point was used as the hydrophobic fiber.

The top sheet and the bottom sheet were spunlace nonwoven fabrics produced by forming fibers web from these raw material fibers with a card machine and applying water jet to the fiber webs to interlace these fibers together in the fiber webs.

The absorbent core, furthermore, was an air through bond nonwoven fabric produced by forming a fiber web from the raw material fibers by means of a card machine and bonding together the fiber web with a hot air dryer. However, in Comparative Example C, the absorbent core was not used; in Comparative Example D, a spunlace bond nonwoven fabric only consisting of the PET with the low melting point was used as the absorbent core.

Each absorbent core was interposed between the top sheet and the bottom sheet, excluding in Comparative Example C. Then, resulting sheets were heat sealed by thermally bonding the thermoplastic fibers together between a top roll with an emboss and a bottom roll. The bonding lines were in the form of wave as shown in FIG. 1, wherein the pitch "p" in the Y direction was 7.5 mm while the interval "b" of the waves in the X direction was 6 mm. The top roll was a steal roll with an emboss in the wave form as shown in FIG. 1 on the surface; and the bottom roll was a steal roll with a flat surface. The surface temperature of both the top roll and the bottom roll was 140° C.; and the top sheet 3, the absorbent core 4 and the bottom sheet 5 in a trilayer structure were pressed at a pressure of 50 kg/cm², and the resulting sheet was led out at a periphery rate of 10 mr/min, to form bonding lines 2.

The wiping sheets in the Examples A, B, C, D and E and in the Comparative Examples A, B, C, D, E and F as shown in Table 1 were tested as follows Test 1 to 3.

Test 1. Slip Properties (wiping load)
1-1. The wiping sheets in the Examples A, B, C, D and E and in the Comparative Examples A, B, C, D, E and F were uniformly sprayed with water at a final sheet weight of 4.0 fold the weight in its dry weight, so as to impregnate the sheets with water.
1-2. The wiping sheets were attached on a commercially available holder for flooring wipers. Then, a commercially available flooring board was placed on a scale, on which the holder was placed subsequently. Then, the holder was at an angle of 45 degrees to the board.
1-3. While maintaining the holder angle, the holder was slid forward at a rate of 0.5 m/sec on the flooring board.
1-4. The load when the holder was placed on the flooring board was defined as zero; and the maximum load (kg) when the holder began to slide was measured.

Test 2. Wiping Area
2-1. The wiping sheets in the Examples A, B, C, D and E and in the Comparative Examples A, B, C, D, E and F were uniformly sprayed with water at a final sheet weight of 4.0 fold the weight in its dry sheet weight, so as to impregnate the sheets with water.
2-2. The wiping sheets were attached to a commercially available holder for flooring wipers.
2-3. Then, the holder was placed on a commercially available flooring board of an area of 1.64 m² to wipe off the whole area of the board.
2-4. After termination of the wiping work, the sheets were removed from the holder, to weigh the sheet weight and determine the decrement of the weight in each sheet.
2-5. The procedures of 2-2 to 2-4 were repeated ten times. When the decrement of the weight of each wiping sheet was 1.0 g per one wiping procedure, the total wiping area was determined.

Test 3. Bending Resistance
The bending resistance of each of the wiping sheets in the Examples A, B, C, D and E and the Comparative Examples A, B, C, D, E and F was measured by the cantilever method of JIS(Japanese Industrial Standard)/L1096.

By the cantilever method, a test piece of a 25-mm width was placed on a horizontal surface of a scaling device having a slanting face at 45 degrees on the side face, and then by sliding the test piece, the slide distance of the test piece was measured when the top of the test piece reached the slanting face. As test pieces, use was made of a test piece cut into a 25-mm width so that the machine direction (direction of most fibers in orientation) of a sheet might elongate toward the slanting face; and a test piece cut into a 25-mm width so that the cross direction of a sheet might elongate toward the slanting face. By using such test pieces, the bending resistance (mm/25 mm) of the sheet along the directions MD and CD was determined. These test pieces were measured in both the dry state and wet state after impregnated with water.

The results of Tests 1, 2 and 3 are shown in Table 2.

In Test 1, a smaller load indicates better slip properties. The load dimension was then marked as ○, Δ and X in Table 2. In Test 1 to measure the slip properties of sheets (wiping load), when a sheet began to slide at a load below 0.3 kg, the load was marked as ○; the load of 0.31 kg or more to 0.5 kg or less was marked as Δ; and the load above 0.51 kg was marked as X.

In Test 2 of wiping area, additionally, higher water retentivity can be procured at a larger total wiping area when the sheet weight is decreased by 1.0 g/time. The total wiping area was evaluated as ○, Δ and X in the decreasing order. In Table 2, a wiping area above 10.0 m² was marked as ○; a wiping area of 8.0 m² or more to 9.9 m² or less was marked as Δ; and a wiping area below 7.9 m² was marked as X.

At Test 3 of the bending resistance, a longer slide distance of a test piece, when the top of the test piece reached the slanting face of the scaling device, means higher bending resistance. Thus, the slide distance of a test piece was marked as ○, Δand X. In Table 2, the bending resistance (mm/25 mm) of a dry test piece along MD/CD being above 120/80 was marked as ○; the bending resistance of 110 to 119/70 to 79 was marked as Δ; and the bending resistance below 99/69 was marked as X. The bending resistance (mm/25 mm) of a wet test piece along MD/CD being above 100/70 was marked as ○; the bending resistance of 90 to 99/60 to 69 was marked as Δ; and the bending resistance below 89/59 was marked as X. Specifically, the preferable range of the bending resistance of the wiping sheet of the present invention is above 70 mm/25 mm in a dry state (mark Δ), more preferably above 80 mm/25 mm in a dry state (mark ○). The bending resistance of a wet test piece containing water of 4-fold the weight in a dry state was preferably above 60 mm/25 mm (mark Δ) and more preferably above 70 mm/25 mm (mark ○).

TABLE 2

| | Slip properties | | Bending resistance | |
|---|---|---|---|---|
| No. | wet state kg | Wipig area m² | dry state mm/25 mm | wet state mm/25 mm |
| Example A | Δ | ○ | ○ | ○ |
| Example B | ○ | ○ | ○ | ○ |
| Example C | ○ | ○ | ○ | ○ |
| Example D | Δ | Δ | Δ | Δ |
| Example E | Δ | ○ | ○ | ○ |
| Comparative Example A | x | ○ | ○ | ○ |
| Comparative Example B | ○ | x | ○ | ○ |
| Comparative Example C | ○ | x | ○ | x |
| Comparative Example D | ○ | x | ○ | x |
| Comparative Example E | Δ | x | Δ | x |
| Comparative Example F | x | ○ | ○ | ○ |

Test results of Example 1

As shown in Table 2, the wiping sheets of Examples A, B,C, D and E were excellent from all the respects of slip properties, wiping area, and bending resistance.

On the contrary, the wiping sheet of Comparative Example A was at rayon contents as high as 80% in the top sheet and the bottom sheet, so that the sheet had poor slip properties.

The wiping sheet of Comparative Example B was at rayon contents as low as 10% in the top sheet and the bottom sheet and at the content of the hydrophobic fiber being 90% by weight. Therefore, the slip properties were good but the wiping area was less. In other words, the water retentivity was poor.

The wiping sheet of Comparative Example C had no absorbent core, so the sheet had lower water retentivity and lower bending resistance in a wet state.

Because the wiping sheet of Comparative Example D comprised an absorbent core composed of a hydrophobic fiber alone, the sheet could not retain water in the absorbent core. Therefore, the bending resistance was low in a wet state.

Like the wiping sheet of Comparative Example E with the basis weight of each of the top sheet, the absorbent core and the bottom sheet being as small as 20 g/m$^2$, not any of the slip properties, wiping area and bending resistance was satisfactory.

On contrast to the wiping sheet of Comparative Example E, the wiping sheet of the Comparative Example F comprised the top sheet, the absorbent core and the bottom sheet with a basis weight as large as 60 g/m$^2$ in each, but the sheet had not good slip properties, although the wiping area was enlarged owing to the high water retentivity and the bending resistance was great. If the basis weight is large as described above, furthermore, the sheet production cost is escalated.

Conclusion

The results of the tests indicate that, in the sheet of a trilayer structure of the top sheet, the absorbent core and the bottom sheet shown in FIG. 2, the rayon contents in the top sheet and the bottom sheet are preferably about 30% by weight or more to 70% by weight or less and the content of the hydrophobic fiber is preferably about 30% by weight or more to 70% by weight or less as well. Because the water retentivity of the absorbent core singly composed of a hydrophobic fiber is poor, the absorbent core may preferably contain the absorbent fiber such as rayon fiber at some extent. So as to give the sufficient bending resistance to the resulting sheet, furthermore, the basis weight of the absorbent core is preferably 25 g/m$^2$ or more to 60 g/m$^2$ or less. The total basis weight of the resulting wiping sheet of the trilayer structure is preferably about 75 g/m$^2$ or more to 160 g/m$^2$ or less.

Example 2

A wiping sheet of the structure shown in FIG. 3 was produced in Example 2. More specifically, there was produced a wiping sheet composed of a top sheet and a bottom sheet, each of sheets being of a bilayer structure composed of a surface layer and a back layer. For comparison with the sheets of the Examples a, b, c, d and e, the sheets shown in Comparative Examples a, b, c and d were produced.

The raw material fibers for the top sheet, the absorbent core and the bottom sheet in the Examples a, b, c, d and e and in the Comparative Examples a, b, c and d were as follows; a rayon fiber of 1.5 denier and a 44-mm length (manufactured by Toho Rayon, Co., Ltd.) was used as the absorbent fiber; and as the hydrophobic fiber, use was made of polyethylene terephthalate (PET) of a melting point as low as 130° C., 2.0 denier and a 51-mm fiber length (manufactured by Toyobo, Co., Ltd.) or sweat-absorbing PET of 1.5 denier and a 44-mm fiber length ("K07" under trade name; manufactured by Toyobo, Co., Ltd.). In the surface layers of the top sheet and the bottom sheet, only sweat-absorbing PET was used as the hydrophobic fiber; while only PET with such low melting point was used in the back layers of the top sheet and the bottom sheet. In the absorbent core, furthermore, use was made of the PET of such low melting point as the hydrophobic fiber.

For the top sheet and the bottom sheet, a spunlace nonwoven fabric was used, which was produced, by applying water jet to a fiber web of a bilayer structure formed from these raw material fibers to interlace thereby the fibers together. As the absorbent core, furthermore, an air through bond nonwoven fabric was used, which was produced by bonding together the fiber web formed from the raw material fibers with a hot air dryer, as in Example 1.

A sheet with the absorbent core interposed between the top sheet and the bottom sheet was bonded together by the same method as for the wiping sheet of Example 1. The shape and pitch of the bonding lines were the same as in Example 1.

TABLE 3

| No. | producing method | | rayon fiber % | synthetic fiber % | Basis weight g/m$^2$ | producing method | rayon fiber % | synthetic fiber % | Basis weight g/m$^2$ | Total basis weight g/m$^2$ |
| --- | --- | --- | --- | --- | --- | --- | --- | --- | --- | --- |
| | | Top sheet · Bottom sheet | | | | Absorbent core | | | | |
| Example a | spunlace | Surface layer | 0 | 100 | 40 | air through bond | 50 | 50 | 40 | 120 |
| | | Back layer | 70 | 30 | | | | | | |
| Example b | spunlace | Surface layer | 30 | 70 | 40 | air through bond | 50 | 50 | 40 | 120 |
| | | Back layer | 70 | 30 | | | | | | |
| Example c | spunlace | Surface layer | 70 | 30 | 40 | air through bond | 50 | 50 | 40 | 120 |
| | | Back layer | 70 | 30 | | | | | | |
| Example d | spunlace | Surface layer | 30 | 70 | 25 | air through bond | 50 | 50 | 25 | 75 |
| | | Back layer | 70 | 30 | | | | | | |
| Example e | spunlace | Surface layer | 30 | 70 | 50 | air through bond | 50 | 50 | 60 | 160 |
| | | Back layer | 70 | 30 | | | | | | |
| Comparative Example a | spunlace | Surface layer | 80 | 20 | 40 | air through bond | 50 | 50 | 40 | 120 |
| | | Back layer | 70 | 30 | | | | | | |
| Comparative Example b | spunlace | Surface layer | 100 | 0 | 40 | air through bond | 50 | 50 | 40 | 120 |
| | | Back layer | 0 | 100 | | | | | | |
| Comparative Example c | spunlace | Surface layer | 30 | 70 | 20 | air through bond | 50 | 50 | 20 | 60 |
| | | Back layer | 70 | 30 | | | | | | |
| Comparative Example d | spunlace | Surface layer | 30 | 70 | 60 | air through bond | 50 | 50 | 60 | 180 |
| | | Back layer | 70 | 30 | | | | | | |

The sheets shown in Table 3 were subjected to the same tests as those for the sheets of Example 1, namely Test 1 (slip properties), Test 2 (wiping area) and Test 3 (bending resistance). The test methods and conditions therefor were totally the same.

The results of these three Tests 1, 2 and 3 are shown in the following Table 4. The method of evaluating the results in Tests 1, 2 and 3 was the same as in Example 1.

TABLE 4

| No. | Slip properties wet state kg | Wipig area $m^2$ | Bending resistance dry state mm/25 mm | wet state mm/25 mm |
|---|---|---|---|---|
| Example a | ○ | ○ | ○ | ○ |
| Example b | ○ | ○ | ○ | ○ |
| Example c | Δ | ○ | ○ | ○ |
| Example d | ○ | Δ | Δ | Δ |
| Example e | ○ | ○ | ○ | ○ |
| Comparative Example a | x | ○ | ○ | ○ |
| Comparative Example b | x | ○ | ○ | ○ |
| Comparative Example c | ○ | x | Δ | x |
| Comparative Example d | Δ | ○ | ○ | ○ |

The results of the tests shown in Table 4 indicate that the wiping sheets of Examples a, b, c, d and e were very preferable in terms of all of slip properties, wiping area and bending resistance in dry and wet states.

Alternatively, the wiping sheets of Comparative Examples a and b were poor in terms of slip properties, because of their higher rayon fiber contents in the surface layers. The wiping sheet of Comparative Example c with a total basis weight as small as 60 g/$m^2$ (a basis weight of 20 g/$m^2$ in each of the top sheet and the absorbent core and the bottom sheet) was poorly water retentive and had therefore a small wiping area, together with low bending resistance in a wet state. The wiping sheet of Comparative Example e with a total basis weight as large as 180 g/$m^2$ (a basis weight of 60 g/$m^2$ in each of the top sheet and the absorbent core and the bottom sheet), had not so good slide properties. Additionally, the production cost was high.

Conclusion

In the wiping sheet of Example 2 in accordance with the present invention, accordingly, the rayon content in the surface layers in the top sheet and the bottom sheet is preferably 0% by weight or more to 70% by weight or less while the content of the hydrophobic fiber is preferably 30% by weight or more to 100% by weight or less. Like Examples a and b, in particular, the content of the hydrophobic fiber is preferably 70% by weight or more. Preferably, the rayon content in the back layers in the top sheet and the bottom sheet is about 70% by weight, while the content of the hydrophobic fiber is about 30% by weight. Therefore, preferably, the total rayon content in the top sheet and the bottom sheet is 35% by weight or more to 70% by weight or less, and the content of the hydrophobic fiber is about 30% by weight or more to 65% by weight or less. The basis weight of each of the top sheet and the bottom sheet is preferably about 25 g/$m^2$ or more to 50 g/$m^2$ or less; and the basis weight of the absorbent core is preferably about 25 g/$m^2$ or more to 60 g/$m^2$ or less.

Example 3

In Example 3, a wiping sheet of a trilayer structure composed of a top sheet, an absorbent core and a bottom sheet as shown in FIG. 2 was produced, wherein emboss was formed on both the sides of the wiping sheet in the X direction. The sheets of Examples (α, β and γ had various emboss patterns. In the Example α, emboss of a dot pattern was formed. On the wiping sheet of the Example β, emboss of a hexagon pattern was formed. On the wiping sheet of the Example γ, emboss of a dot pattern was formed and the emboss had openings. For comparison with these Examples α, β and γ, a wiping sheet with no emboss treatment as shown in FIG. 1 was produced ard used as Comparative Example.

Like the Examples 1 and 2, the compositions of the raw materials in the top sheets, the absorbent cores and the bottom sheets in the wiping sheets of Examples α, β and γ and the Comparative Example are as follows; the absorbent fiber was a rayon fiber of 1.5 denier and a 51-mm fiber length (manufactured by Toho Rayon, Co., Ltd.); and the hydrophobic fiber was polyethylene terephthalate (PET) of a melting point as low as 130° C., 2.0 denier and a 51-mm fiber length (manufactured by Toyobo, Co., Ltd.) or PET of 1.4 denier and a 44-mm fiber length (manufactured by Toyobo, Co., Ltd.).

For each of the top sheet and the bottom sheet, use was made of a spunlace nonwoven fabric produced from the following raw materials; the rayon fiber and the PET of the low melting point and PET of 1.4 denier and a 44-mm fiber length. For the absorbent core, furthermore, use was made of an air through bond nonwoven fabric produced from the rayon fiber and the PET of the lowmelting point. The basis weight of each of the top sheet, the absorbent core and the bottom sheet was 45 g/$m^2$.

After interposing the absorbent core between the top sheet and the bottom sheet, the sheet of a trilayer structure was heat sealed by absolutely the same method as in Examples 1 and 2.

Both the sides of each of the wiping sheets of such trilayer structure thus produced were embossed in the X direction. By using the known steal match emboss, the wiping sheets of Examples α and β were embossed without heating under conditions of an emboss pressure of 50 kg/$cm^2$ and an emboss rate of 20 m/min. Consequently, an emboss pattern of dots was formed on the wiping sheet of Example α. An emboss pattern of hexagon was formed on the wiping sheet of Example β.

By using the known protruded steal match emboss, the wiping sheet of Example γ was embossed at an emboss pressure of 2 kg/$cm^2$, an emboss rate of 5 m/min and a temperature of 80° C. Consequently, a wiping sheet of an emboss pattern with openings in a dot pattern was produced.

As Comparative Examples, the wiping sheets of Examples α, β and γ without emboss processing were used.

The bending resistances were measured as described in Test 3 about Examples α, β and γ and Comparative Examples. Additionally, the following Test 4 was performed.

Test 4 Pulling Strength from Wiping Holder 4-1. The ends of the wiping sheets of Examples α, β and γ and Comparative Examples were inserted and attached into an insert portion "h" of a commercially available wiping holder shown in FIG. 5.

4-2. A clip with a string was attached to the other remaining free end of the wiping sheets attached to the wiping holder.

4-3. Pulling the string on the clip, the wiping sheets were drawn out from the wiping holder.

4-4. Just when the wiping sheets were drawn out, the pulling strength (g) was measured.

The face of the wiping sheet in contact with the roller with protrusions (embossed face) at the process of emboss processing was defined as a surface; and the other face of the wiping sheet on the back side of the surface was defined as a back face. The pulling strength, when the wiping sheet was attached to the wiping holder with its surface directed outside, was defined as the pulling strength of the surface. The pulling strength, when the wiping sheet was attached to the wiping holder with its back face directed outside, was defined as the pulling strength of the back face. The results of Tests 3 and 4 are shown in the following Table 5.

TABLE 5

|  | Comparative Example not-embossed | Example α embossed in a dot pattern | Example β embossed in a hexagon pattern | Example γ embossed in a dot pattern with openings |
|---|---|---|---|---|
| Basis weight g/m² | 136.4 | 136.4 | 136.4 | 136.4 |
| Thickness mm | 1.17 | 1.37 | 1.45 | 1.35 |
| Bending resistance mm/25 mm |  |  |  |  |
| MD | 125 | 109 | 105 | 107 |
| CD | 85 | 68 | 65 | 70 |
| Pulling strength g |  |  |  |  |
| Surface layer | 287 | 550 | 664 | 480 |
| Back layer | 225 | 400 | 591 | 465 |

Table 5 indicates that the bending resistance of the wiping sheets of Examples and Comparative Examples were not so different from each other.

However, compared with Examples (α, β and γ, the pulling strength was lower in the sheets of the Comparative Examples.

Conclusion

By forming emboss on a wiping sheet in zones to be attached to a wiping holder thereby and giving flexibility to the wiping sheet, the wiping sheet is readily attached to the wiping holder and the attached wiping sheet is hardly dropped out.

As has been described above in detail, the wiping sheet of the present invention exerts good slip properties, an excellent absorbency and a water retentivity, and therefore, the wiping sheet of the present invention can be used for both dry and wet wiping. The wiping sheet is so strong that the wiping sheet is sufficiently durable of continuous use. Because the wiping sheet is thick at some extent, the wiping sheet can readily be held with hands and can be recycled and used, after washing off dirty with water. Because the wiping sheet has a greater bending resistance owing to the presence of an absorbent core therein, the shape restoration of the wiping sheet is great, even after water rinsing and squeezing.

By emboss processing both the sides of the wiping sheet to be flexible thereby, the wiping sheet can readily be attached to a cleaning kit (wiping holder) and is not readily dropped out of the holder.

We claim:

1. A wiping sheet comprising:
    exterior sheets comprising an absorbent fiber and a thermoplastic hydrophobic fiber, each of the exterior sheets having a basis weight of 25 to 55 g/m², being a spunlace non-woven fabric and having most of the fibers oriented in a direction; and
    an absorbent core interposed between said exterior sheets, said absorbent core comprising an absorbent fiber and a thermoplastic hydrophobic fiber and having a basis weight of 25 to 60 g/m² and being a non-woven fabric produced by thermally bonding together the thermoplastic hydrophobic fiber so that the absorbent core has a greater bending resistance than the exterior sheets, said absorbent core and said exterior sheets being bonded together on bonding lines formed across the direction in which most of the fibers are oriented in the exterior sheets, whereby the wiping sheets having a bending resistance of 70 mm or more in a dry state and a bending resistance of 60 mm or more in such a state that the wiping sheet contains water, whereby the weight of the water is four-fold to the weight of the wiping sheet in the dry state, as measured by the cantilever method according to JIS/L1096 using a test piece of the wiping sheet with a width dimension of 25 mn.

2. A wiping sheet according to claim 1, wherein said absorbent core is an air through bond nonwoven fabric produced by melting and bonding together the thermoplastic hydrophobic fiber in hot air.

3. A wiping sheet according to claim 1, wherein the exterior sheets are of a bilayer structure composed of a surface layer and a back layer and the back layer contains more of the absorbent fiber than the surface layer.

4. A wiping sheet according to claim 3, wherein the surface layer contains the absorbent fiber at 0% by weight or more to 70% by weight or less and contains the hydrophobic fiber at 30% by weight or more to 100% by weight or less and wherein the surface layer and back layer together contain the absorbent fiber at 35% by weight or more to 70% by weight or less and the hydrophobic fiber at 30% by weight or less to 65% by weight or less.

5. A wiping sheet according to claim 3, wherein the hydrophobic fiber in the surface layer is coated or kneaded with a hydrophilic surfactant to be a hydrophobic or sweat-absorbing fiber.

6. A wiping sheet according to claim 5, wherein at least one of the exterior sheets is crepe processed.

7. A wiping sheet according to claim 5, wherein the hydrophilic or sweat-absorbing fiber is selected from the group consisting of sweat-absorbing polypropylene polyethylene and polyethylene terephthalate.

8. A wiping sheet according to claim 1, wherein said bonding lines are formed by heating the exterior sheets and the absorbent core under pressure and melting and bonding together the thermoplastic fiber contained in the exterior sheets and the absorbent core.

9. A wiping sheet according to claim 8, wherein said bonding lines are in a wave form or a saw tooth form.

10. A wiping sheet according to claim 8, wherein the pitch of the aligned bonding lines is shorter than the length of the fiber composing the exterior sheets.

11. A wiping sheet according to claim 10, wherein the length of the absorbent fiber contained in the exterior sheets is 30 to 60 mm and the pitch of the aligned bonding lines is 5 to 30 mm.

12. A wiping sheet according to claim 1, wherein the bending resistance of areas on both the sides of the wiping sheet which are to be held on a wiping holder is lower than the bending resistance of the central area of the wiping sheet.

13. A wiping sheet according to claim 12, wherein said areas to be held on the wiping holder are emboss processed so that the bending resistance of the areas is reduced.

14. A wiping sheet according to claim 1, wherein the hydrophobic fiber in the exterior sheets is coated or kneaded with a hydrophilic surfactant to be a hydrophilic or sweat-absorbing fiber.

15. A wiping sheet according to claim 14, wherein the hydrophilic or sweat-absorbing fiber is selected from the group consisting of sweat-absorbing polypropylene polyethylene and polyethylene terephthalate.

* * * * *

UNITED STATES PATENT AND TRADEMARK OFFICE
CERTIFICATE OF CORRECTION

PATENT NO. : 6,013,349
DATED : January 11, 2000
INVENTOR(S) : Naohito Takeuchi, et al.

It is certified that error appears in the above-indentified patent and that said Letters Patent is hereby corrected as shown below:

In Claim 1, line 25, change "mn" to --mm--.

Signed and Sealed this

Twenty-seventh Day of February, 2001

Attest:

NICHOLAS P. GODICI

*Attesting Officer*  *Acting Director of the United States Patent and Trademark Office*